(12) United States Patent
Penlerick

(10) Patent No.: US 7,185,548 B2
(45) Date of Patent: Mar. 6, 2007

(54) APPARATUS AND METHOD FOR MEASURING FLOW BETWEEN ENDS OF A BREAK IN A FLUID LINE

(76) Inventor: Delwin T. Penlerick, 927 W. 3rd St., Alliance, NE (US) 69301-0782

( * ) Notice: Subject to any disclaimer, the term of this patent is extended or adjusted under 35 U.S.C. 154(b) by 4 days.

(21) Appl. No.: 11/109,245

(22) Filed: Apr. 18, 2005

(65) Prior Publication Data

US 2006/0230843 A1 Oct. 19, 2006

(51) Int. Cl.
*G01F 1/28* (2006.01)
(52) U.S. Cl. .................................... 73/861.74
(58) Field of Classification Search ............ 73/861.83, 73/861.89, 861.52, 861.74
See application file for complete search history.

(56) References Cited

U.S. PATENT DOCUMENTS

| | | | |
|---|---|---|---|
| 2,929,248 A | 3/1960 | Sprenkle | |
| 3,398,765 A | 8/1968 | Oshima et al. | |
| 3,733,898 A | 5/1973 | Yamamoto et al. | |
| 4,232,710 A | 11/1980 | Gallo et al. | |
| 4,308,755 A * | 1/1982 | Millar et al. | 73/861.77 |
| 4,841,781 A | 6/1989 | Khalifa | |
| 5,323,661 A | 6/1994 | Cheng | |
| 5,529,084 A | 6/1996 | Mutsakis et al. | |
| 5,531,484 A | 7/1996 | Kawano | |
| 5,596,152 A * | 1/1997 | Bergervoet et al. | 73/861.83 |
| 6,290,266 B1 | 9/2001 | Kawano | |

FOREIGN PATENT DOCUMENTS

JP 55122120 9/1980

* cited by examiner

*Primary Examiner*—Jewel Thompson
(74) *Attorney, Agent, or Firm*—Ellen Reilly; John E. Reilly; The Reilly Intellectual Property Law Firm, P.C.

(57) ABSTRACT

An apparatus and method for measuring fluid flow in a break between closely spaced confronting ends of a fluid line including first and second angularly extending conduit sections forming a U-shaped assembly housing straightening vanes and a metering device.

22 Claims, 4 Drawing Sheets

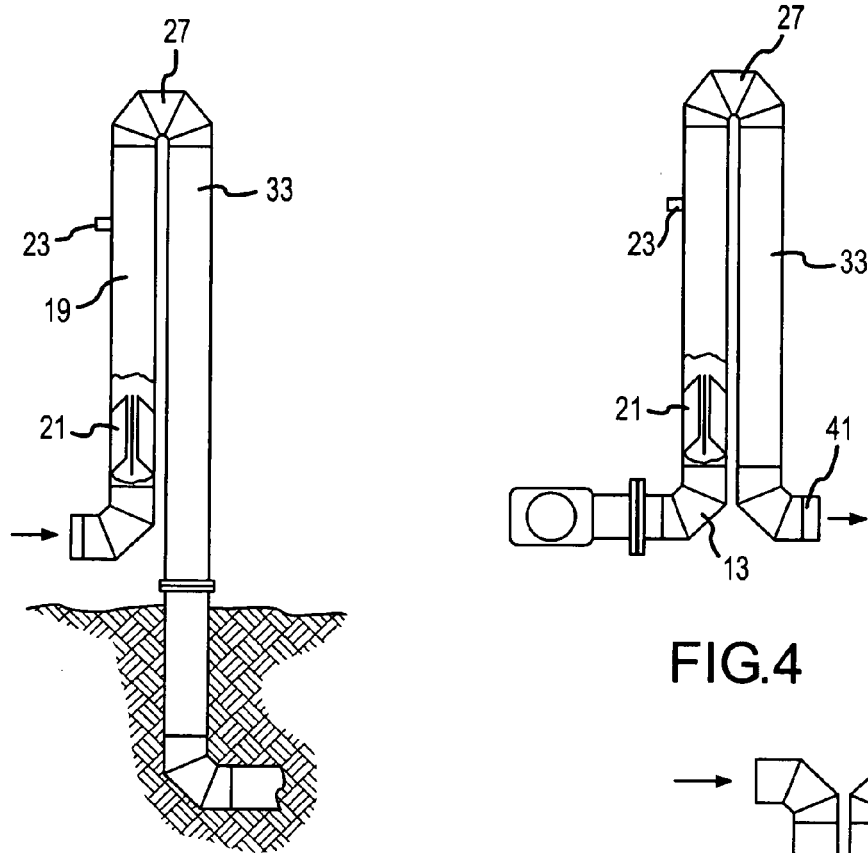
FIG.3
FIG.4
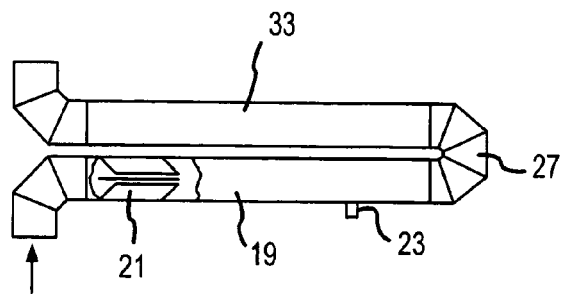
FIG.5
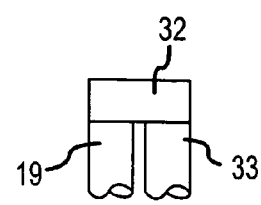
FIG.7
FIG.6

APPARATUS AND METHOD FOR MEASURING FLOW BETWEEN ENDS OF A BREAK IN A FLUID LINE

BACKGROUND AND FIELD OF INVENTION

This invention relates to an apparatus for measuring flow in a break between ends of a fluid line and a method for accomplishing same; and more particularly relates to a novel and improved apparatus and method for measuring fluid that requires minimal separation in a fluid line.

Water usage in an agricultural setting typically requires the installation of metering devices in the field. Various agencies are offering cost-share programs, making use of water metering devices more desirable if not mandatory. Use of a water meter device aids in accurate metering of water for conservation purposes as well as for regulation purposes. Installation of metering devices typically requires retrofitting the user's current water transport system. Agricultural water meter systems require a specified linear distance between a water line and a water metering device to avoid improper readings due to turbulence, vortices, jetting, cavitations and other fluid flow disruptions. Most agricultural water meters require 48" to 96" of space for proper metering. This requirement means upstream straight pipe recommendations of 10 to 30 diameters of pipe, 5 diameters minimum when straightening vanes are use. While the velocity profile of water through a straight pipe remains fairly constant, in an irrigation line, check valves and elbows produce turbulent flow. Turbulent flow forces users to install meter housing devices with extensive pipeline configurations and long upstream straight runs in order to accommodate a water meter and obtain accurate readings. Oftentimes, the linear space that is available for installing a water meter device is insufficient and this results in a user having to run an extensive amount of piping in order to accommodate the water meter. Currently, users are forced to dig open pits for placement of the pipeline and reinstall a longer piece of pipe or adding at least 48" of straight pipe above ground to accommodate a water meter. This requires substantial cost for backhoe work and labor to reconnect the fittings. Also, there is a risk of damage to the existing structures as well.

A combination of a water flow conditioning device and a meter housing is needed to conveniently and economically measure water flow. Of the flow conditioning units presently in use, straightening vanes or guide vanes are disposed along the flow line to minimize turbulence and regulate flow distribution within a pipe section. A number of devices have been developed for conditioning the flow of fluid for measurement. Representative of such devices are set forth in U.S. Pat. No. 2,929,248 to Sprenkle, U.S. Pat. No. 4,821,768 to Lett and U.S. Pat. No. 5,323,661 to Cheng. Although these devices aid in conditioning fluid flow in a pipeline, none of these address the problem solved by applicant's invention.

There is a need for an apparatus that solves the current problem facing agricultural water users, accommodating a meter device in a limited space while still providing accurate measurement of fluid flow. The combination of straightening or guide vanes, elbow sections and an equalization pipe provides for a novel apparatus that reduces the distance of flow separation or breaks in a fluid line in such a way that turbulence and distribution of the fluid are reduced while accurate measurement of the fluid is accomplished. The present invention insures a full pipe flow absent air, jetting, turbulence, vortices, cavitations and other velocity disruptions that increase friction resulting in obstruction of the laminar flow of fluids.

SUMMARY OF THE INVENTION

It is an object of the present invention to provide for a novel and improved method and apparatus for housing a metering device in a break between closely spaced, confronting ends of a fluid line.

It is another object of the present invention to provide an apparatus of the type described for a novel and improved method and means for reducing turbulence and obtaining accurate fluid flow measurement.

It is another object of the present invention to provide for a novel and improved method of transporting water for measurement while reducing the amount of piping necessary for accurate measurement.

It is a further object of the present invention to provide for a novel and improved apparatus for efficiently transporting fluid to a metering device, avoiding costly alternatives.

In accordance with the present invention, apparatus is provided for connecting closely spaced first and second ends of a fluid line to measure fluid flow therethrough comprising an inlet of a first conduit section extending at an angle from the fluid line and connected to the first end, the first conduit housing a meter device and vane members and a return flow conduit section secured to an outlet of and extending in a reverse direction to the first conduit section and connected at an angle to the second end of the fluid line.

There is also provided a method for measuring fluid flow through a pipeline comprising the steps of forming a break in the pipeline, inserting a U-shaped conduit in the break to divert fluid flow at an angle to the pipeline, reducing any turbulence in the fluid and advancing the fluid through a line measuring device prior to return flow into the pipeline.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 3 is a side view shown partially in section of an alternate form of meter housing in accordance with the present invention;

FIG. 4 is a side view shown partially in section of an alternate form of meter housing in accordance with the present invention;

FIG. 5 is a side view shown partially in section of another form of the meter housing of the present invention;

FIG. 6 is a side view shown partially in section of still another of the meter housing adapted for underground use;

FIG. 7 is a front view of a form of return elbow of the present invention;

DETAILED DESCRIPTION

Referring in more detail to the drawings, there is shown by way of illustrative example in FIGS. 1 to 9 an apparatus 10 for housing a meter device, for example, in agricultural uses.

Figure 1:
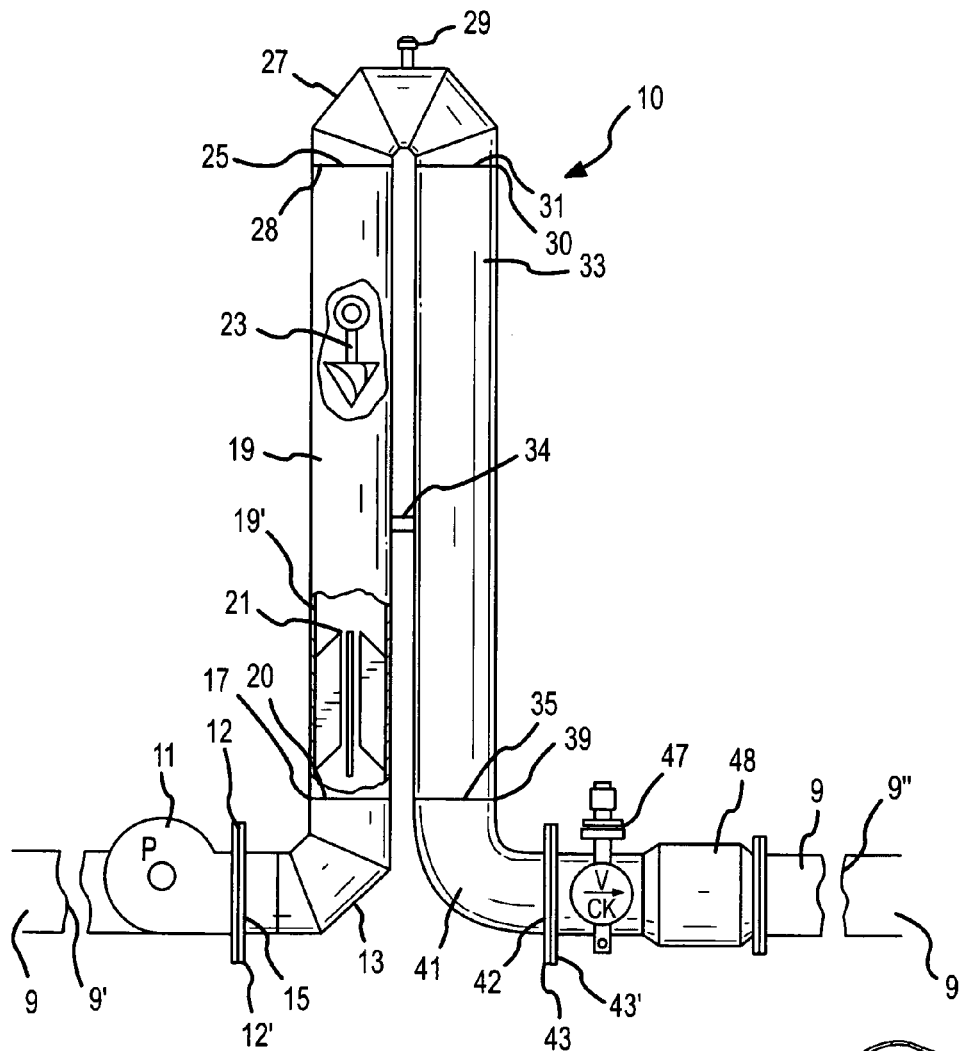
FIG. 1 is a somewhat schematic view shown partially in section of a form of meter housing in accordance with the present invention.
Figure 2:
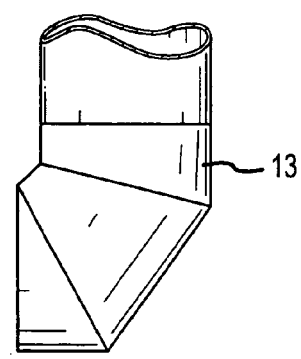
FIG. 2 is a side view of one of the elbows shown in FIG. 1.

The apparatus 10 of the present invention is connected at a first inlet end 15 to a break in a fluid line 9, alternatively to a pump 11 shown in FIG. 1, or is located downstream of a backflow prevention device 47, such as, a chemigation check valve discussed in more detail later. See FIGS. 8 and 9. The fluid line 9 has closely spaced first and second ends 9' and 9", respectively. The pump 11 may be a turbine pump of standard construction using centrifugal force on a stack of impellers to pull fluid, for example, water from a well. An example of a turbine pump used in this invention is Goulds Pump manufactured by ITT Industries, Seneca Falls, N.Y. The pump 11 is connected to a flange 12 and is an industry standard preferably of ½" thick metal with equally spaced bolt holes to secure the connection between the pump 11 and a flange 12' of an elbow section 13. The first end 15 of the elbow section 13 is connected to the flange 12', forming a secure, water-tight connection. The elbow may be bolted to the flange 12' or welding is also an option. The flanges 12, 12' are then bolted to each other with a gasket (not shown) placed between to insure a water-tight connection. The elbow 13, as shown in FIG. 2, may take many forms, such as, a mitered, three piece elbow or a sweep elbow angled at 90°. The diameter of the elbow may range from 4" up to 16", depending on the needs of the fluid flow system. A second end or outlet 17 of the elbow 13 is located at a 90° angle to the first end 15 and aligned vertically but may also extend at an acute or diagonal angle from the first end 15. The elbow 13 is secured to a primary end 20 of a first straight conduit or pipe section 19 having the same diameter as the elbow 13. The straight pipe section 19 preferably has a constant diameter throughout. Once again, the end sections may be welded or secured in some other airtight fashion.

Figure 10:
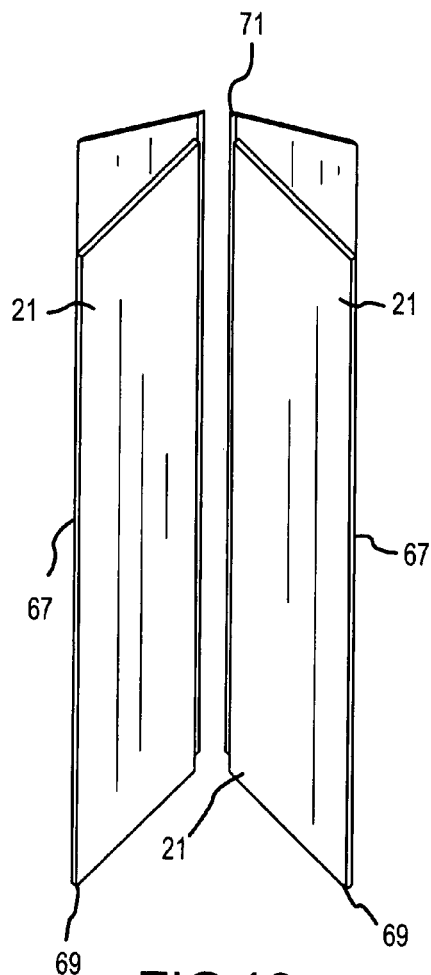
FIG. 10 is a perspective view of the preferred form of straightening vanes shown in FIG. 1.
Figure 11:
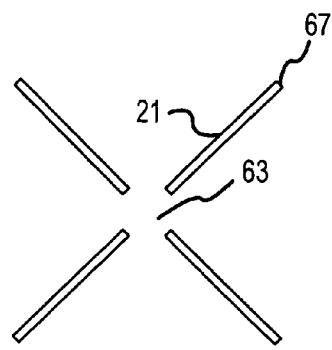
FIG. 11 is a top plan view of straightening vanes shown in FIG. 10.

Housed within the straight pipe 19 are blade members or straightening vanes 21 which are designed to relieve flow turbulence as a result of fluid flow through the elbow 13 and to cause uniform distribution of fluid through the pipe section 19. As shown in FIGS. 10 and 11, the panels or vanes are welded at a 90° angle along edges 67' inside the pipe 19 and are also set symmetrically and concentrically along an interior or inside wall 19' of the first pipe section 19 forming an open center 63 allowing for fluid to pass along upper and lower surfaces 65, 65' of the vanes as well as through the center opening 63. The straightening vanes 21 shown in FIGS. 10 and 11 comprise four separate panels 21, each panel having the shape of a flat parallelogram. A side edge 67 of the straightening vane panel 21 may be welded or bolted in along an interior length 19' of the first pipe section 19. Each of the straightening panels 21 are preferably welded in along the interior diameter of the first pipe section 19 forming an open-centered star configuration as shown in FIG. 10. A leading edge 69 of each of the straightening vanes 21 begins along an outer circumference 18 of the interior 19' of the first pipe section 19 extending radially inwardly while a trailing edge 71 extends along an inner circumference 18' of the interior of the first pipe section 19. There is an inward bevel (not shown) on the leading edge 69 and an outward bevel (not shown) along the trailing edge 71 further promoting laminar fluid flow.

Figure 12:
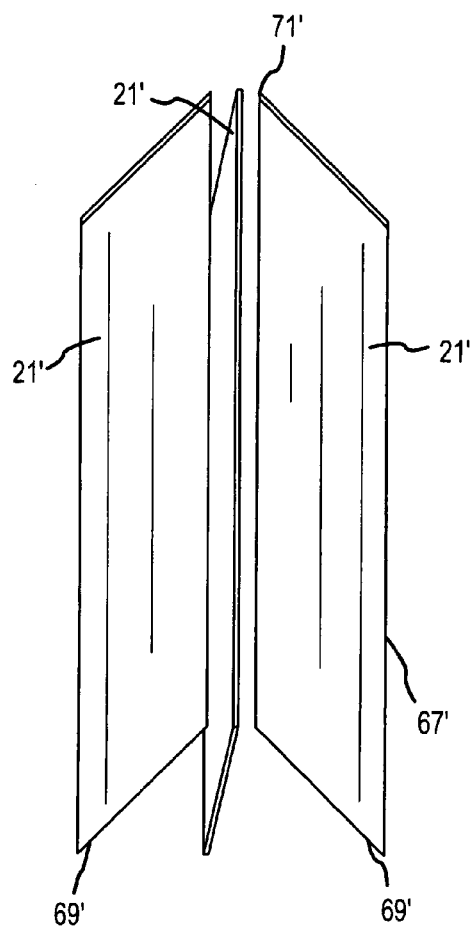
FIG. 12 is a perspective view of an alternate form of straightening vanes shown in FIG. 1.
Figure 13:
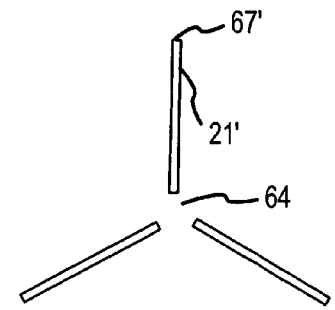
FIG. 13 is a top plan view of the straightening vanes shown in FIG. 12.

A second embodiment of the straightening vanes shown in FIGS. 12 and 13 comprises three identical vane panels 21' which are welded in along the outer circumference 18 of the interior 19' of the first pipe section 19. Each panel is set at a 120° angle along the interior of the pipe diameter, as shown in FIGS. 12 and 13; and the leading edge 69' of each of the straightening vanes 21' begins along the outer circumference 18 of the interior 19' of the first pipe section 19 while the trailing edge 71' extends along the inner circumference 18' of the interior of the first pipe section 19. The straightening vanes 21' form or surround an open center 64 when the panels 21' are mounted along the interior of the pipe diameter. See FIG. 13. The length of the vanes 21 and 21' is preferably within the 15" range allowing adequate space between the straightening vanes 21 and a metering device 23. The straightening vanes set forth thus far are by way of example and are not for limitation purposes. Variations on the straightening vanes may be used to accomplish the distribution of fluid as well as to relieve turbulent flow. The straightening vanes 21 or 21' may be welded inside the straight pipe section 19, immediately following the lower end 20, or an additional conduit section 36 may be added upstream of the vanes 21 in order to comply with various Department of Health regulations. See FIGS. 8 and 9.

Fluid traveling through the straightening vanes 21 or 21' then passes through the flow meter 23. The straight pipe section 19 acts as an equalization chamber allowing the laminar flow of fluids upon exiting the straightening vanes 21 or 21' prior to measurement by the flow meter 23. Various manufacturers of flow meters are the GrowSmart Flow Meter manufactured by Seametrics, Kent, Wash., U.S.A. and the McCrometer Propeller Flow Meter manufactured by McCrometer, Inc., Hemet, Calif. The flow meter is typically inserted at a location on the straight pipe 19 opposite the straightening vanes to allow for flow equalization. As fluid moves through the pipe section 19 it passes a magnetized zone near one end of the inserted flow meter 23, and a voltage proportional to the flow rate is generated (not shown). Electrodes on the immersed end of the flow meter measure the small voltage and internal electronics convert it to rate and total flow measurements across a given cross-section of the pipe. Propeller meters, such as, the ones manufactured by McCrometer, Inc. may also be used, using rotator blades or propellers which transmit a signal upon rotation.

Figures 8, 9:
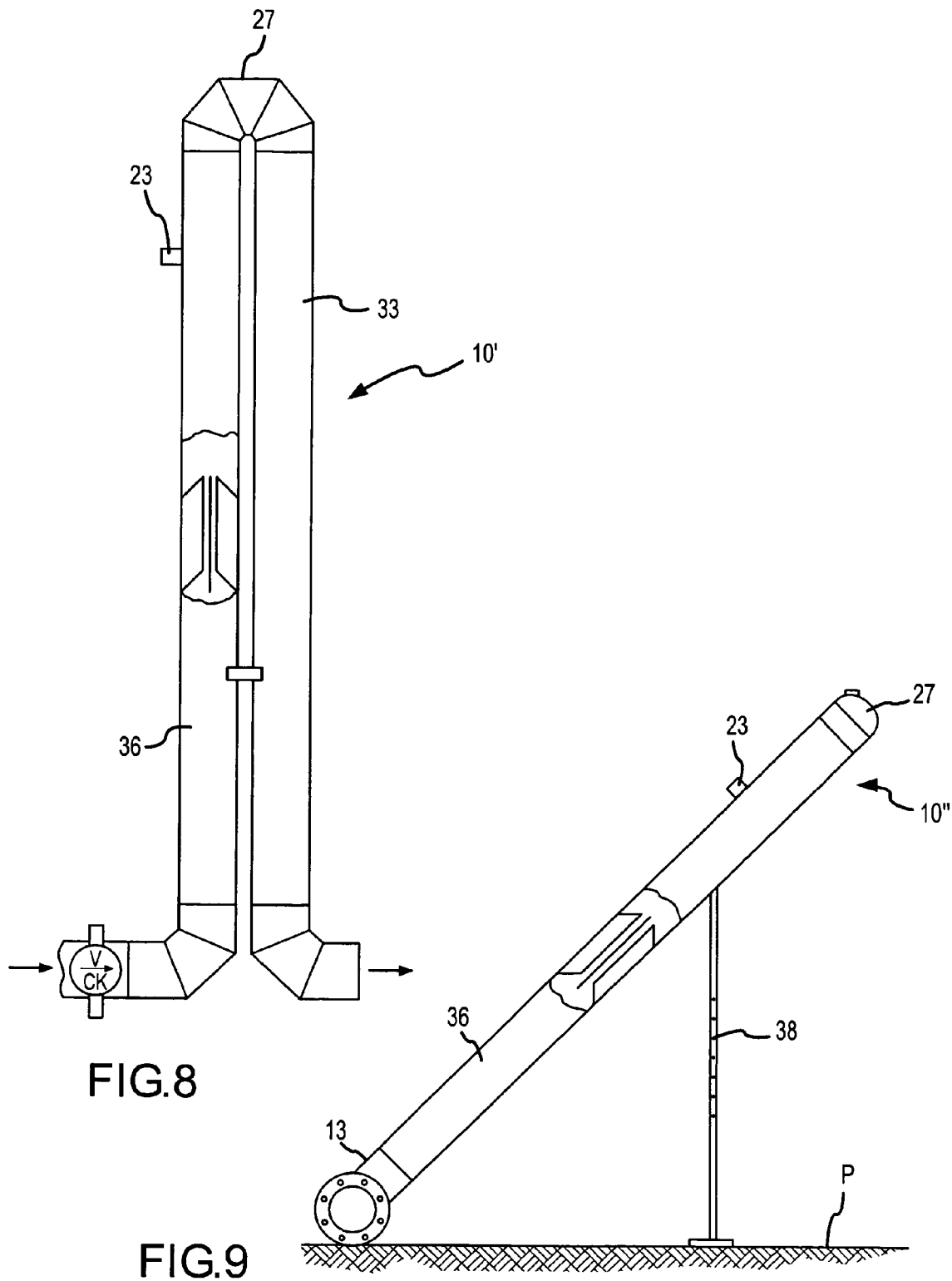
FIG. 8 is a side view of an alternate form of the present invention.
FIG. 9 is a side view of another alternate form of the present invention.

Fluid passes through the straight pipe 19 and into a return flow conduit or elbow section 27. The return elbow section includes a 180° five piece mitered elbow manufactured by Schumacher Irrigation, Platte Center, Nebr. but a seven or ten piece mitered elbow, for example, could be used. Any other type of elbow or return system may be used allowing fluid to travel in a path returning it to the fluid line 9. Other variations include a box return 32 as shown in FIG. 8 having a greater volume capacity than the mitered elbow. Referring to FIG. 1, a first end 28 of the return elbow 27 is connected to a second end 25 of the pipe 19. Air relief valve 29 is attached to an upper portion of the return elbow 27 for venting when the apparatus is aligned in a vertical position. Typical relief valves include air vents manufactured by Fresno Valves & Castings or Waterman Industries, Exeter, Calif. A second end 30 of the return elbow 27 is connected to a first end 31 of a secondary conduit or pipe section 33 which allows fluid to be transported back into the fluid line 9. A second end 35 of the secondary pipe section 33 is connected to an end 39 of a secondary elbow 41 which may be a mitered or sweep elbow and extends in a reverse direction to the inlet of the first conduit section. An outlet end 42 of the return elbow 41 is connected at an angle to the second end 9" of the fluid line. The outlet end 42 is secured to a flange 43 in the fashion previously described for flange 12, 12' and connected in one embodiment to a secondary flange 43' which may then be connected to a backflow prevention device, such as, a chemigation check valve 47, which prevents backflow of chemicals into the fluid line. Several manufacturers make these valve in 4", 6", 8", 10" and 12" diameter models. The check valve 47 may then be connected to a connector, such as, a wedge tight connector 48, a rubber hose boot connection with clamps (not shown) or a gasketed, ring lock hook-and-band connection (not shown). This connection allows the fluid which has passed through the flow meter to return into the fluid line 9. As mentioned previously, the apparatus 10 may also be installed downstream of the backflow prevention device as shown in FIGS. 8 and 9. FIG. 8 demonstrates an alternate form of invention 10' wherein the additional conduit section 36 is added in advance of the straightening vanes 21 or 21'.

Another form of invention as shown in

FIG. 9 demonstrates the apparatus 10" aligned at an approximate 45° angle with a horizontal plane and having an adjustable strut or leg 38 secured to the assembly 10" to provide further support. In this embodiment, the apparatus is identical to that of FIG. 8 with the exception of the orientation of the apparatus with respect to a horizontal plane P. The return into the fluid line 9 is identical to FIG. 8 but not shown. Both FIGS. 8 and 9 are typically installed with the backflow prevention device upstream of the straightening vanes 20 or 21' and the flow meter 23.

A minimum distance required between the elbows 13 and 41 is approximately 20", reducing by over half the linear distance required for a flow meter while maintaining accurate meter readings. The apparatus is generally U-shaped with the first conduit section and the second conduit section in a parallel alignment which aids in transporting fluid to and away from a flow meter, while reducing the distance required between closely spaced confronting ends of a fluid line. The pipe sections 19 and 33 are typically secured to one another with a connection member 34 helping to further stabilize the unit.

In operation, fluid, typically water, is pumped from a well using the pump 11. Alternatively, water may be transported through the fluid line 9 through the backflow prevention device 47. A break in the fluid line 9 allows for installation or insertion of the apparatus 10 or 10' between closely spaced first and second ends 9', 9" of the fluid line. The fluid then passes through the flanges 12, 12' into the first elbow section 13 where it undergoes a transition in laminar flow to turbulent flow due to the bend in the elbow. In order to accommodate a water meter device, it is necessary to provide a suitable length of pipe section ahead of the meter along with straightening vanes to convert to laminar flow. The friction at the pipe wall combined with the fluid's viscosity causes the velocity of the fluid to be slower and closer to the pipe wall. Obstructions and bends in the piping further distort the velocity profile (the highest velocity region in the cross-section). Elbows and valves will shift the center of the velocity profile away from the center of the conduit forcing contact with the leading edges 69 of the straightening vanes 21. Fluid also passes through the open center 63, reducing the turbulent flow while disbursing fluid so that it evenly flows through the first straight pipe section 19. At this point, the straight pipe section 19 acts as an equalization chamber, allowing for minimum turbulence in the fluid prior to measurement by the flow meter. The fluid then advances through the flow meter 23 which measures the flow rate of the fluid. It is also necessary to provide a return path for the fluid being metered in a fashion that will minimize turbulence caused by jetting and provide better metering characteristics than typical horizontal mounting positions. This is accomplished by diverting the fluid to flow upwardly through a riser which contains the measuring device and return downwardly into the fluid line which extends along the ground.

The straightening vanes are situated within 5X (X being pipe diameter) of the meter as per most manufacturers' recommendations. The location of the vanes is significant to substantially reduce turbulence created by the angle of the elbow. Vertical mounting and substantially vertical mounting are preferred but virtually any mounting position is possible on a 360° scale. See FIGS. 3–9. The vertical mounting position provides more efficient disbursement of water within the pipe and allows for easy reading of the water meter as it is at eye level. The acute angle mounting position allows for adequate spacing between the backflow prevention device and the flow meter while allowing for clearance of irrigation spray. The inlet elbow and 180° turn elbow at the top of the riser serve to oppose each other with respect to turbulent flows created by the inlet elbow. The opposing forces will tend to equalize in the area where the meter is located particularly when pressurized, again, producing laminar flow of fluids and accuracy of measurement.

A vertical mounting axis and an acute mounting axis are the preferred forms as shown in FIGS. 1, 3, 4, 6, 8 and 9. The vertical mounting position utilizes gravity along with the straightening vanes to minimize turbulence of in-stream flow and jetting action created by upstream obstructions such as chemigation check valves, check valves, regulators and other jetting devices. FIG. 6 demonstrates a form of vertical mounting underground with the water meter 23' placed in a second pipe section 33' along with the straightening vanes 21'. Horizontal mounting as shown in FIG. 5 eliminates the need for an air vent on top and would achieve similar results given that the pipe is full of water.

It is therefore to be understood that while preferred forms of invention are herein set forth and described, the above and other modifications may be made therein without departing from the spirit and scope of the invention as defined by the appended claims and reasonable equivalents thereof.

I claim:

1. In apparatus for connecting closely spaced first and second ends of a fluid line extending along a ground surface to measure fluid flow therethrough, said apparatus comprising:

an inlet of a first conduit section extending at an angle from said fluid line and connected to said first end;

said first conduit section housing vane members and a meter device downstream of said vane members;

said vane members extending radially inwardly from an inner wall surface of said conduit section and surrounding an open center therein; and a return flow conduit section secured to an outlet of and extending in a reverse direction to said inlet of said first conduit section and connected at an angle to said second end of said fluid line, said first and return flow conduit sections being of inverted U-shaped configuration.

2. In apparatus according to claim 1 wherein said meter device is installed a predetermined distance from said vane members.

3. In apparatus according to claim 1 wherein said return flow conduit section includes a 180° mitered elbow.

4. In apparatus according to claim 1 wherein said return flow conduit section is aligned in closely spaced parallel relation to said first conduit section.

5. In apparatus according to claim 1 wherein said first conduit section is of uniform diameter.

6. In apparatus according to claim 1 wherein each of said vane members is in the form of a parallelogram with a leading edge along an inside wall of said first conduit section.

7. In apparatus for housing a metering device in a break between closely spaced confronting ends of a fluid line, said apparatus defined by a generally U-shaped riser comprising:
    a first elbow member, said elbow member connected between a first end of a primary straight pipe and one of said ends of said fluid line;
    said primary straight pipe including a plurality of blade members extending radially inwardly surrounding an open center and an equalization section upstream of said metering device;
    a first end of a return path member secured to a second end of said primary straight pipe;
    a second end of said return path member secured to a first end of a secondary straight pipe; and
    a return elbow between a second end of said secondary straight pipe and another of said ends of said fluid line.

8. In apparatus according to claim 7 wherein said primary straight pipe is of a diameter sufficient to house said meter device.

9. In apparatus according to claim 7 wherein said blade members are symmetrically aligned.

10. In apparatus according to claim 9 wherein said blade members are concentrically aligned forming a center channel.

11. In apparatus according to claim 7 wherein said blade members have a leading edge along an outer circumference of an interior of said primary pipe section.

12. In apparatus according to claim 7 wherein said return path member includes an air vent.

13. In apparatus according to claim 7 wherein said return path member includes a pipe section of greater volume than said primary straight pipe.

14. In apparatus according to claim 7 wherein said primary straight pipe and said secondary straight pipe are aligned in a parallel plane.

15. In apparatus for housing a meter device between closely spaced ends of a fluid line extending along a ground surface, said apparatus comprising:
    a riser including an inverted U-shaped pipe member including two straight upwardly and downwardly extending entry and exit pipe sections, respectively, and a connector section therebetween;
    a first of said pipe sections housing means for reducing turbulence, a straight pipe section followed by said meter device;
    said turbulence-reducing means having panels, each said panel having a single connection point with said first of said pipe sections and surrounding an open center; and
    entry means and exit means connected to opposite ends of said pipe member for directing fluid out of and into said fluid line, respectively.

16. In apparatus according to claim 15 wherein said entry means and exit means direct fluid angularly from and back into said fluid line.

17. In apparatus according to claim 15 wherein said connector section includes a 180° mitered elbow.

18. In apparatus according to claim 15 wherein said means for reducing turbulence includes a plurality of parallelogram-shaped panels concentrically aligned and extending radially inwardly within said first of said pipe sections.

19. A method of measuring flow through a pipeline, said pipeline including an inverted U-shaped conduit with an entry section, an exit section and a connector therebetween, said conduit housing straightening vanes upstream of a meter device, comprising the steps of:
    forming a break in said line;
    inserting said U-shaped conduit in said break whereby to divert flow at an angle to said pipeline;
    placing said straightening vanes within said entry section;
    forming an open center channel within said straightening vanes;
    reducing turbulence in the fluid;
    advancing the fluid through an equalization chamber within said entry section; and
    measuring the flow of fluid downstream from said straightening vanes and prior to return of the fluid into said pipeline.

20. A method according to claim 19 wherein the fluid is diverted to flow upwardly through said measuring device and return downwardly into said pipeline.

21. A method according to claim 19 wherein said return flow member includes a second straight conduit section.

22. A method according to claim 21 wherein the steps further include securing said straight conduit section to said second straight conduit section in a parallel alignment.

* * * * *